(12) United States Patent
Kim et al.

(10) Patent No.: US 8,428,028 B2
(45) Date of Patent: Apr. 23, 2013

(54) METHOD AND APPARATUS FOR FAST AND EFFICIENT HANDOVER AT LINK LAYER OF WIRELESS LAN

(75) Inventors: Se-hong Kim, Suwon-si (KR); Sang-su Nam, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 732 days.

(21) Appl. No.: 11/511,482

(22) Filed: Aug. 29, 2006

(65) Prior Publication Data

US 2007/0047492 A1 Mar. 1, 2007

(30) Foreign Application Priority Data

Aug. 29, 2005 (KR) .................. 10-2005-0079611

(51) Int. Cl.
*H04W 4/00* (2009.01)
*H04W 36/00* (2009.01)

(52) U.S. Cl.
USPC .......................................... 370/331; 455/436

(58) Field of Classification Search .................. 455/440, 455/435.3, 453, 455, 416, 186, 436, 437, 455/434, 450; 370/329, 331, 332, 338, 245, 370/341, 395.3, 395.4; 709/227; 380/273
See application file for complete search history.

(56) References Cited

U.S. PATENT DOCUMENTS

| | | | |
|---|---|---|---|
| 6,185,423 B1 * | 2/2001 | Brown et al. .................. | 455/434 |
| 6,360,264 B1 * | 3/2002 | Rom ............................. | 709/227 |
| 6,522,881 B1 * | 2/2003 | Feder et al. .................... | 455/437 |
| 7,020,439 B2 * | 3/2006 | Sinivaara et al. ............. | 455/41.2 |
| 7,328,018 B2 * | 2/2008 | Lee et al. ....................... | 455/436 |
| 2002/0102978 A1 | 8/2002 | Yahagi | |
| 2003/0139197 A1 | 7/2003 | Kostic et al. | |
| 2004/0146035 A1 * | 7/2004 | Lee et al. ...................... | 370/338 |
| 2004/0202130 A1 | 10/2004 | Backes et al. | |
| 2004/0224690 A1 | 11/2004 | Choi et al. | |
| 2005/0163080 A1 * | 7/2005 | Suh et al. ...................... | 370/331 |
| 2006/0013398 A1 * | 1/2006 | Halasz et al. ................. | 380/273 |
| 2006/0062183 A1 * | 3/2006 | Forte et al. .................... | 370/331 |
| 2006/0109815 A1 * | 5/2006 | Ozer et al. .................... | 370/329 |

FOREIGN PATENT DOCUMENTS

| | | |
|---|---|---|
| CN | 1510879 A | 7/2004 |
| CN | 1518390 A | 8/2004 |
| CN | 1522093 A | 8/2004 |

(Continued)

OTHER PUBLICATIONS

Communication from the Japanese Patent Office, issued Jun. 21, 2011 in Japanese Patent Application No. 2006-229805.
Communication and Extended European Search Report for European Application No. 06119591.3 issued Aug. 30, 2011.
Zhun Zhong-Phillips, "RRM and Roaming Support", Internet Citation, URL:http://grouper.ieee.org/groups/802/11, Apr. 14, 2003.
Martin Lefkowitz et al, "Proposed draft text for the site reporting mechanism for TGK", Internet Citation, URL:http//www.grouper.ieee.org/groups/802/11/Documents/D3T151-200.html; Mar. 13, 2003.
IEEE-SA Standards Board, Part 11: Wireless LAN Medium Access Control (MAC) and Physical Layer (PHY) Specifications, ANSI/IEEE Std. 802.11, 1999 Edition, Reaffirmed Jun. 12, 2003.

*Primary Examiner* — Kent Chang
*Assistant Examiner* — Kuo Woo
(74) *Attorney, Agent, or Firm* — Sughrue Mion, PLLC

(57) ABSTRACT

A handover method and apparatus at a link layer of a wireless LAN according to the IEEE 802.11 standard are provided to minimize a handover latency. The handover method is performed in a mobile station moving from one subnet to another subnet, each subnet being managed by one of a plurality of access points. Channels available to the mobile station are selectively scanned based on information regarding one and more access points which are estimated to be present in a communication area of the mobile station, and a handover is performed to one of the access points based on the scanning result.

18 Claims, 10 Drawing Sheets

FOREIGN PATENT DOCUMENTS

| | | |
|---|---|---|
| EP | 1 418 711 A2 | 5/2004 |
| EP | 1448010 A1 | 8/2004 |
| JP | 10191442 A | 7/1998 |
| JP | 2003-259443 A | 9/2003 |
| JP | 2004-207922 A | 7/2004 |
| JP | 2005-117357 A | 4/2005 |
| JP | 2005-192187 A | 7/2005 |
| KR | 10-2004-0061654 A | 7/2004 |
| KR | 10-2004-0067419 A | 7/2004 |
| WO | 2004/054283 A2 | 6/2004 |
| WO | WO 2004/054283 A2 | 6/2004 |

* cited by examiner

| 61 | 62 | 63 | 64 |
|---|---|---|---|
| NEIGHBOR AP | BSSID | CHANNEL | NUMBER OF ASSOCIATED STATIONS |
| 1 | AP1 | 1 | 7 |
| 2 | AP2 | 6 | 10 |
| 3 | AP3 | 11 | 13 |

METHOD AND APPARATUS FOR FAST AND EFFICIENT HANDOVER AT LINK LAYER OF WIRELESS LAN

CROSS-REFERENCE TO RELATED PATENT APPLICATIONS

This application claims priority from Korean Patent Application No. 10-2005-0079611, filed on Aug. 29, 2005, in the Korean Intellectual Property Office, the disclosure of which is incorporated herein in its entirety by reference.

BACKGROUND OF THE INVENTION

1. Field of the Invention

Methods and apparatuses consistent with the present invention relate to handover in a wireless local area network (LAN), and more particularly, to fast and efficient handover at a link layer of a wireless LAN based on the Institute of Electrical and Electronics Engineers (IEEE) 802.11 standard.

2. Description of the Related Art

In recent years, a remarkable increase in the number of users who use mobile communication services and mobile communication services that support multimedia communications has triggered a need to provide seamless communication services to moving users. Accordingly, a lot of attention has been devoted to a fast handover in a link layer of a wireless LAN based on the IEEE 802.11 standard. The handover at the link layer of the wireless LAN is a technology whereby a mobile station that moves between basic service sets (BSSs) that a plurality of access points respectively manage can detect a new access point and be associated with the new access point before it is completely disconnected from a BSS managed by an access point, thus maintaining seamless communication services. The "BSS", which is a term used in the IEEE 802.11 standard, indicates a subnet managed by an access point.

FIGS. 1 and 2 are views illustrating related art wireless LANs. Referring to FIGS. 1 and 2, each related art wireless LAN includes a mobile station (MS) 10 and first and second access points (AP 1 and AP 2) 201 and 202. Referring to FIG. 1, the mobile station 10 is moving from a BSS managed by the first access point 201 to a BSS managed by the second access point 202. In this case, the mobile station 10 measures the strength of a signal received from the first access point 201, and scans channels available to the mobile station 10 to detect a new access point when the measured signal strength is less than a predetermined threshold. Next, the mobile station 10 measures the strength of a signal received from the second access point 202 that is detected according to the scanning result, and determines whether to perform a handover from the first access point 201 to the second access point 202, based on the measuring result.

According to the IEEE 802.11 standard, a scanning manner in which a mobile station spontaneously transmits a probe request frame and receives a response frame to the probe request frame to detect an access point is referred to as "active scanning", and a scanning manner in which the mobile station passively receives a beacon frame to detect an access point is referred to as "passive scanning".

Referring to FIG. 2, the mobile station leaves a BSS managed by the first access point 201, and enters a BSS managed by the second access point 202. In this case, the mobile station 10 measures the strengths of signals received from the first and second access points 201 and 202, and performs a handover to the second access point 202 when the measuring result shows that the strength of the signal received form the second access point 202 is stronger than that of the signal received from the first access point 201.

FIG. 3 is a graph illustrating the strengths of signals received from the first and second access points 201 and 202 of FIG. 1 or 2. Referring to FIG. 3, the y-axis of the graph denotes the strengths of the signals received from the access points 201 and 202, and the x-axis of the graph denotes the distance between the first and second access points 201 and 202. Referring to FIG. 3, the strengths of the signals received from the first and second access points 201 and 202 are the same at a T point on the x-axis. If the mobile station 10 moves to the right of the T point, the strength of the signal received from the second access point 202 is greater than that of the signal received from the first access point 201, and thus, the mobile station 10 performs a handover to the second access point 202.

However, as described above, conventionally, the mobile station 10 has to scan all of a plurality of channels available to detect a new access point, thereby increasing the handover latency. In particular, in the case of passive scanning, the handover must be delayed until the mobile station 10 receives a beacon frame, thereby increasing the handover latency more and more.

Also, since it is impossible to smoothly provide communication services with only an access point in a region crowded with wireless LAN users, several access points are further installed to disperse the load of communications. However, as described above, conventionally, the mobile station 10 determines whether to perform a handover only in consideration of the strength of a signal received from an access point, and therefore, the handover is concentrated to an access point that transmits a strongest signal.

SUMMARY OF THE INVENTION

The present invention provides a method and apparatus capable of solving handover latency and convergence of a handover to an access point.

The present invention also provides a computer readable recording medium that stores a program for executing the above method in a computer.

According to an aspect of the present invention, there is provided a handover method which is performed in a mobile station moving from one subnet to another subnet, each subnet being managed by one of a plurality of access points, the handover method comprising selectively scanning channels available to the mobile station, based on information regarding one or more access points which are estimated to be present in a communication area of the mobile station; and performing a handover to one of the access points based on the scanning result.

According to another aspect of the present invention, there is provided a handover apparatus of a mobile station which moves from one subnet to another subnet, each subnet being managed by one of a plurality of access points, the handover apparatus comprising a scan processor selectively scanning channels available to the mobile station, based on information regarding one and more access points which are estimated to be present in a communication area of the mobile station; and a handover processor performing a handover to one of the access points based on the scanning result received from the scan processor.

According to another aspect of the present invention, there is provided a computer readable recording medium that stores a program that executes the above handover method in a computer.

According to another aspect of the present invention, there is provided a handover method which is performed in a mobile station moving from one subnet to another subnet, each subnet being managed by one of a plurality of access points, the handover method comprising computing network load values in one and more access points which are estimated to be present in a communication area of the mobile station, based on information regarding the access point; and performing a handover to one of the access points based on the computed network load value.

According to another aspect of the present invention, there is provided a handover apparatus in a mobile station which moves from one subnet to another subnet, each subnet being managed by one of a plurality of access points, the handover apparatus comprising a computing unit computing network load values in one or more access points which are estimated to be present in a communication area of the mobile station, based on information regarding the estimated access points; and a handover processor performing a handover to one of the access points based on the computed network load values.

According to another aspect of the present invention, there is provided a computer readable recording medium that stores a program that executes the above handover method in a computer.

According to another aspect of the present invention, there is provided a handover supporting method which is performed in an access point for a mobile station which moves from one subnet to another subnet, each subnet being managed by one of a plurality of access points, the handover supporting method comprising updating information regarding one and more access points which are estimated to be present in a communication area of the mobile station, based on information received from the mobile station; and transmitting the updated information to the mobile station to selectively scan channels available to the mobile station.

According to another aspect of the present invention, there is provided a handover supporting method which is performed in an access point for a mobile station which moves from a subnet to another subnet, each subnet being managed by one of a plurality of access points, the handover supporting method comprising an update unit updating information regarding one and more access points which are estimated to be present in a communication area of the mobile station, based on information received from the mobile station; and a transmitter transmitting the information updated by the update unit to the mobile station to selectively scan channels available to the mobile station.

According to another aspect of the present invention, there is provided a computer readable recording medium that stores a program that executes the above handover method in a computer.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, exemplary embodiments of the present invention will be described in greater detail with reference to the accompanying drawings. In particular, the exemplary embodiments of the present invention are obtained by changing a part of the IEEE 802.11 standard to solve handover problems according to the IEEE 802.11 standard, and thus, the present invention will be described with respect to the "association" part of handover method in this disclosure. The other "authentication" and "diassociation" parts of the handover method are performed according to the IEEE 802.11 standard.

Figure 1:
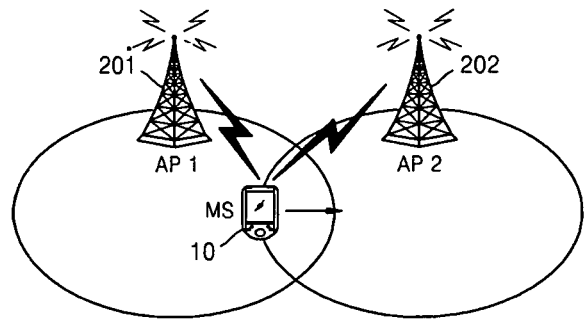
FIGS. 1 and 2 are views illustrating related art wireless LANs.
Figure 2:
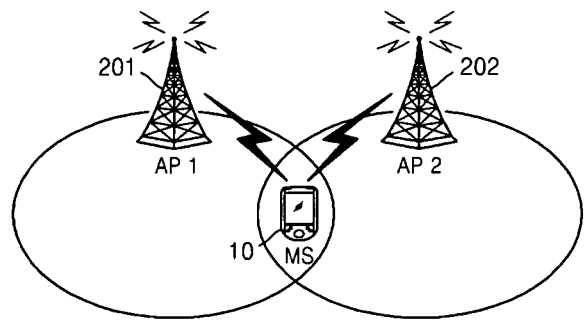
Figure 3:
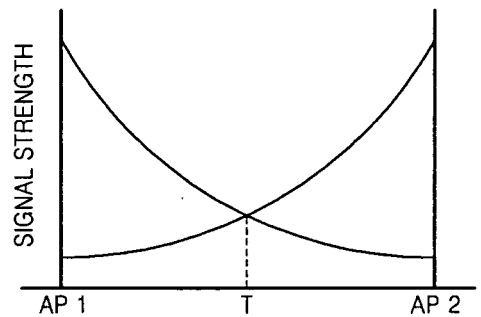
FIG. 3 is a graph illustrating the strengths of signals received from access points of FIG. 1 or 2.
Figure 4:
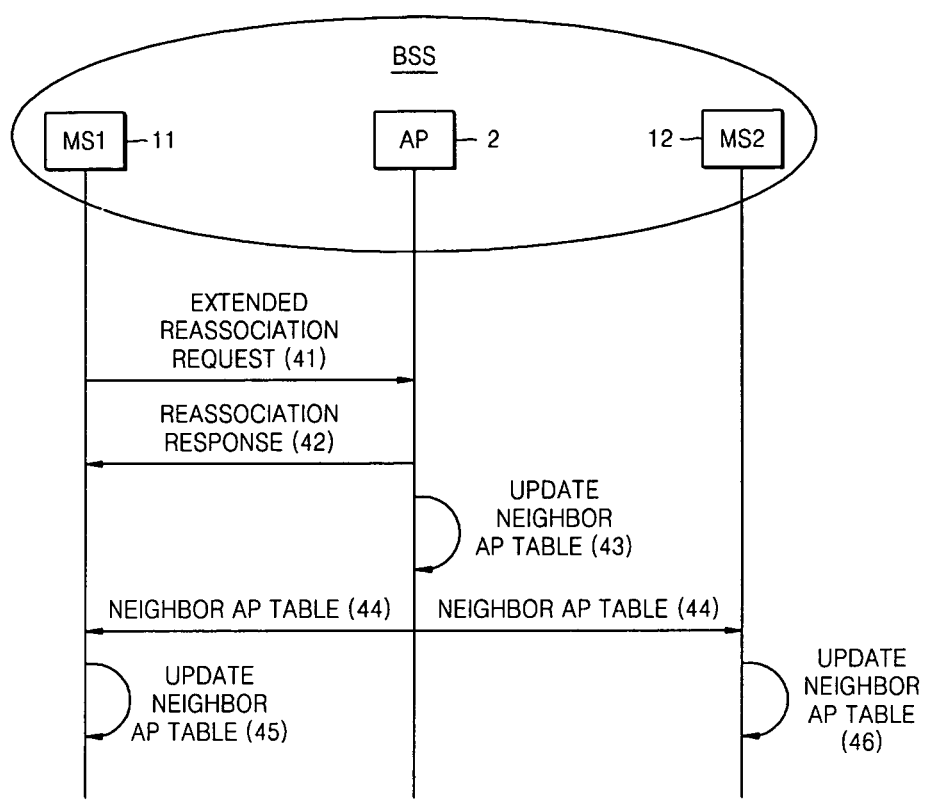
FIG. 4 is a flowchart illustrating a handover method according to an exemplary embodiment of the present invention.

FIG. 4 is a flowchart illustrating a handover method according to an exemplary embodiment of the present invention. Referring to FIG. 4, the part of the handover method is performed at a link layer of a wireless LAN that includes first and second mobile stations 11 and 12 being located in an access point 2 and a BSS managed by the access point 2. FIG. 4 illustrates the two mobile stations 11 and 12, but it would be apparent to those of ordinary kill in the art that the number of mobile stations belonging to the BSS managed by the access point 2 is not limited. In a handover method according to an exemplary embodiment of the present invention it may be understood that a mobile station performs a handover method or an access point supports a handover.

Figure 5:
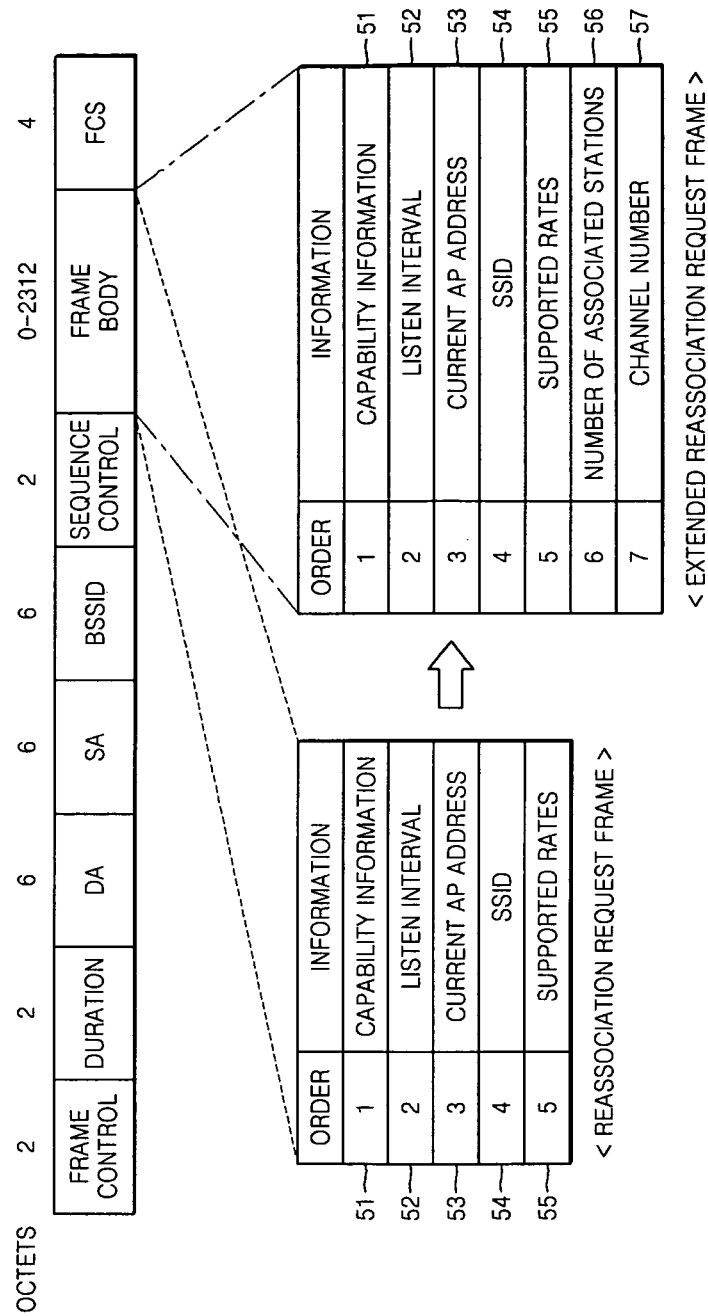
FIG. 5 is a view illustrating the construction of an extended reassociation request frame according to an exemplary embodiment of the present invention.

Referring to FIG. 4, the first mobile station 11 transmits an extended reassociation request frame, shown in FIG. 5, to the access point 2 so that the first mobile station 11 is associated with the access point 2 that is newly detected, and the access point 2 receives the extended reassociation request frame (41). In particular, in operation 41, the first mobile station 11 transmits the extended reassociation request frame to the access point 2 to be associated with the first mobile station 11. The extended reassociation request frame contains information regarding access points that are estimated to be located in a communication area of the first mobile station 11, i.e., an access point adjacent to an access point associated with the first mobile station 11.

FIG. 5 is a view illustrating the construction of an extended reassociation request frame according to an exemplary embodiment of the present invention. Referring to FIG. 5, the extended reassociation request frame is a management frame according to the IEEE 802.11 standard. A frame body field of the extended reassociation request frame includes a capability information field 51, a listen interval field 52, a current access point address field 53, a service set identification (SSID) field 54, and a supported rates field 55.

In the present exemplary embodiment, the frame body field of the extended reassociation request frame further includes fields recording information regarding access points that are estimated to be present in a communication area of the first mobile station 11, e.g., a number of associated stations field 56 that indicates a total number of mobile stations associated with the access point and a channel number field 57 indicating the number of a channel that the access point uses.

Referring to FIG. 4, the access point 2 transmits a reassociation response frame to the first mobile station 11 in response to the extended reassociation request frame received in operation 41, and the first mobile station 11 receives the reassociation response frame (42).

Next, the access point 2 prepares to be associated with the first mobile station 11 that transmits the extended reassociation response frame, based on the information in the extended reassociation request frame (43). In particular, in operation 43, the access point 2 updates a table, i.e., a neighbor access point table shown in FIG. 6, which contains the information regarding the access point (hereinafter referred to as "the neighbor access point") that is estimated to be present in the communication area of the first mobile station 11, based on the information in the extended reassociation request frame. More specifically, in operation 43, the access point 2 updates the information regarding the neighbor access point by adding the number of associated stations field 56 and the channel number field 56 of the extended reassociation request frame to the neighbor access point table.

Figures 6, 7:
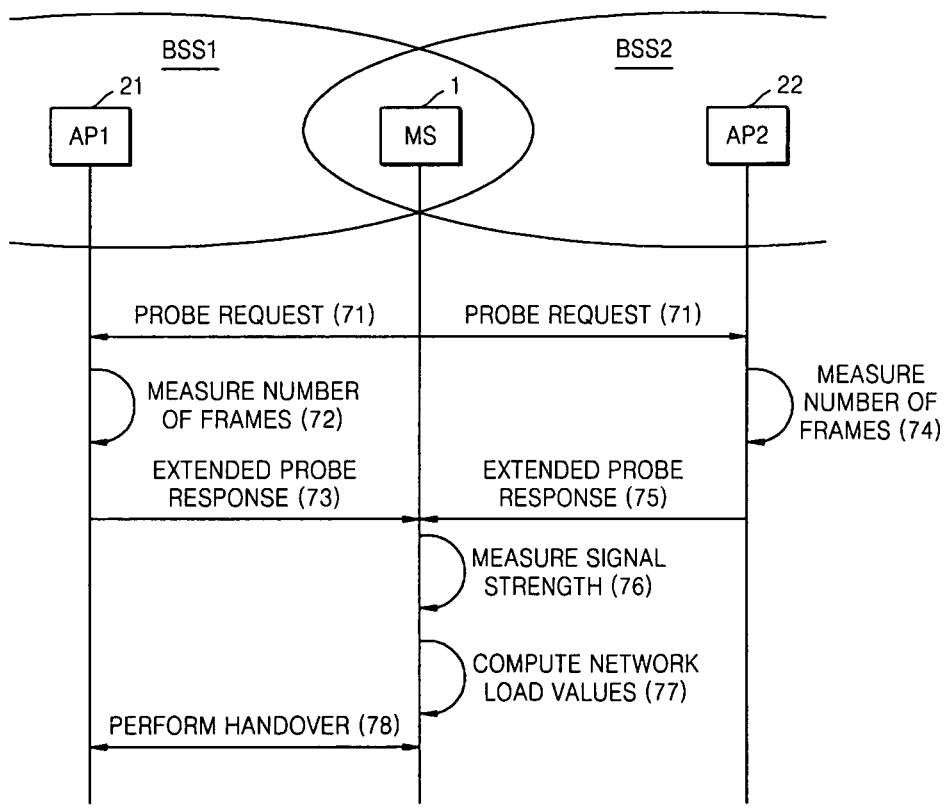
FIG. 6 is a view illustrating a neighbor access point table according to an exemplary embodiment of the present invention.
FIG. 7 is a flowchart illustrating a handover method according to another exemplary embodiment of the present invention.

FIG. 6 is a view illustrating a neighbor access point table according to an exemplary embodiment of the present invention. Referring to FIG. 6, an entry of the neighbor access point table includes a neighbor access point number field 61, a BSS identification (ID) field 62, a channel number field 63, and a number of associated stations field 64.

The access point number field 61 stores the number of access points that are estimated to be located in the communication area of the access point 2. More specifically, the access point 2 allocates access point numbers to neighbor access points listed in the neighbor access point table in the reverse order in which the neighbor access points were added. For instance, a value of "1" is allocated to an access point that has lastly been added to the neighbor access point table, a value of "2" is allocated to an access point that was added right before the access point allocated with the value of "1". That information regarding an access point is added to the neighbor access point table 61 later than the information regarding the access points being estimated to be present in the communication area of the access point 2, indicates that the access point is very likely to be closest to the access point 2 in an unsettled wireless LAN.

An entry that includes the neighbor access point number field 61 having a value greater than a predetermined value may be deleted from the neighbor access point table. For instance, an entry that includes the access point number field 61 having a value greater than 5 is deleted from the neighbor access point table. In this case, the neighbor access point table has a maximum of 5 entries. The information regarding an access point is added to the neighbor access point table earlier than the information regarding the access points that are estimated to be present in the communication area of the access point 2, indicates that the access point is least likely to be closest to the access point 2 in an unsettled wireless LAN.

The BSS ID field 62 records the ID of a BSS managed by an access point that is estimated to be present in the communication area of the first mobile station 11. More specifically, the access point 2 determines the ID of the BSS from a BSS ID field of the extended reassociation request frame received in operation 41, and records the ID of the BSS in the BSS ID field 62 of the neighbor access point table. According to the IEEE 802.11 standard, a BSS is managed by an access point, and thus, the ID of the BSS can be used to identify the access point. In other words, when the ID of the BSS recorded in the neighbor access point table is identical to the ID of the BSS recorded in a BSS ID field of the extended reassociation request frame received in operation 41, the information regarding the access point is not added as a new entry to the neighbor access point table but is added by replacing the existing entry having the same ID of the BSS.

The channel number field 63 records the number of a channel used by an access point that is estimated to be present in the communication area of the first mobile station 11. Specifically, the access point 2 determines the number of the channel used by the access point that is estimated to be present in the communication area of the first mobile station 11 from the channel number field 57 of the frame body field of extended reassociation request frame received in operation 41, and records the channel number in the channel number field 63 of the neighbor access point table.

The number of associated stations field 64 records a total number of mobile stations associated with the access points that are estimated to be present in the communication area of the first mobile station 11. In detail, the access point 2 determines the total number of the associated mobile stations from the number of associated stations field 56 of the frame body field of the extended reassociation request frame received in operation 41, and records the total number in the number of associated stations field 64 of the neighbor access point table.

Referring to FIG. 4, the access point 2 broadcasts a frame containing the neighbor access point table to all mobile stations related to the BSS managed by the access point 2, and the first and second mobile station 11 and 12 receive the broadcast frame (44). The frame broadcast by the access point 2 in operation 44 may be an extended beacon frame that contains the neighbor access point table or a newly defined frame.

Next, the first mobile station 11 and the second mobile station 12 acquire a newly updated neighbor access point table from the frame received in operation 44, and update the neighbor access point table of each of the first and second mobile stations 11 and 12 based on the updated neighbor access point table (45 and 46). That is, whenever a mobile station tries to perform a handover to an access point, neighbor access point tables of all of a plurality of mobile stations entering a BSS managed by the access point are simultaneously updated based on information transmitted from the mobile station to the access point.

FIG. 7 is a flowchart illustrating a handover method according to another exemplary embodiment of the present invention. Referring to FIG. 7, the handover method is performed at a link layer of a wireless LAN that includes first and second access points 21 and 22 and a mobile station 1 located between BSSs managed by the first and second access points 21 and 22. FIG. 7 illustrates the two access points 21 and 22, but it would be apparent to those of ordinary skill in the art that the number of access points in a communication area of the mobile station 1 is not limited.

Referring to FIG. 7, the mobile station 1 transmits a probe request frame to detect a new access point, and the first and second access points 21 and 22 receive the probe request frame (71). That is, active scanning in which a mobile station spontaneously transmits a probe request frame to detect an access point is performed.

In particular, in operation 71, if a neighbor access point table of the mobile station 1 has two or more entries, the mobile station 1 selectively scans available channels based on the neighbor access point table. More specifically, in operation 71, the mobile station 1 transmits the probe request frame to the first and second access points 21 and 22, each managing a BSS having identification recorded in a BSS ID field of each entry of each neighbor access point table, via channels each having a channel number recorded in a channel field of each entry. This means that only the channels used by the first and second access points 21 and 22 that are estimated to be present in the communication area of the mobile station 1, that is, the access points 21 and 22 adjacent to an access point associated with the mobile station 1, are selected to be scanned.

Next, the first access point 21 counts the number of frames that it transmitted or received for a period of time F in order to measure the amount of data that the first access point 21 transmitted or received in the period of time F (72). The period of time F must be less than the difference between the amount of time required to receive the probe request frame and the amount of time required to transmit a response frame to the probe request frame.

Figure 8:
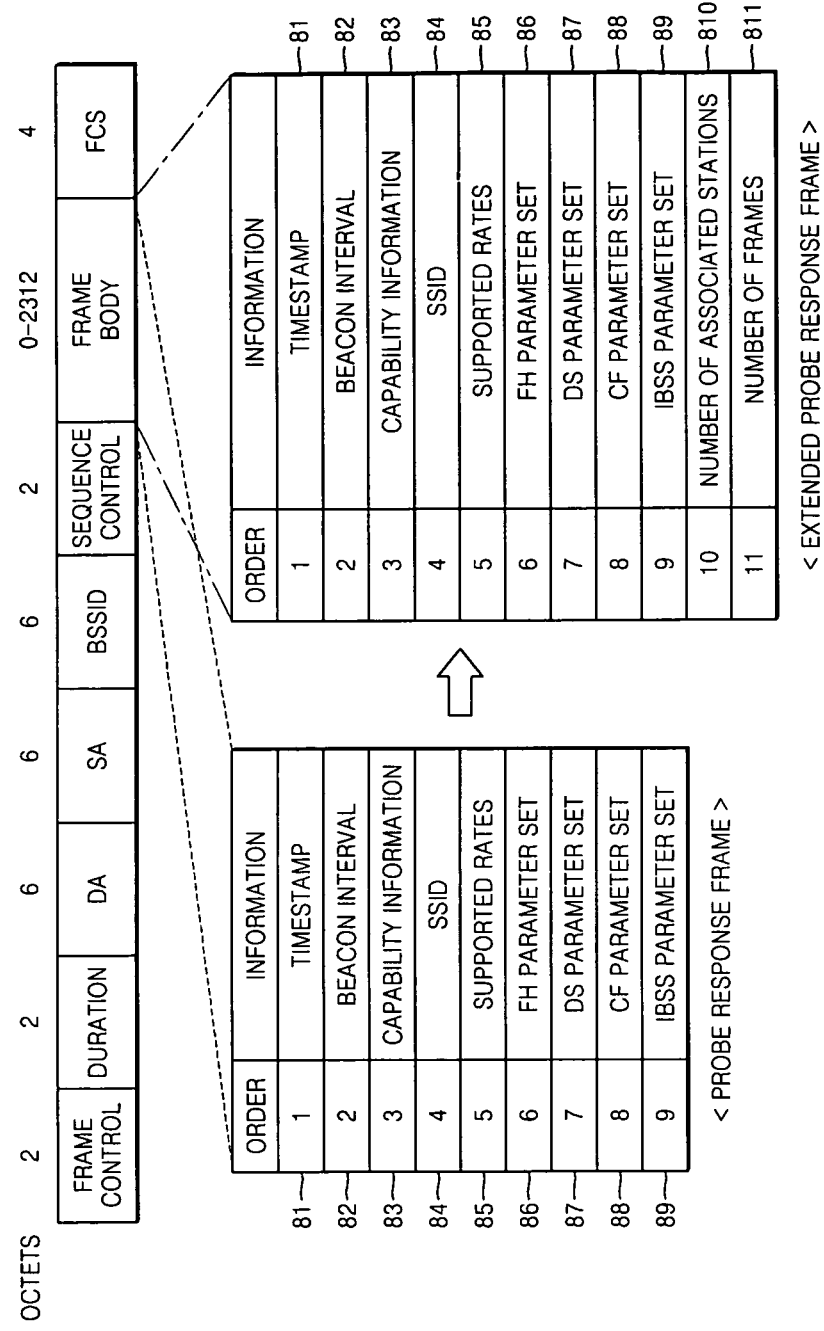
FIG. 8 is a view illustrating the construction of an extended probe response frame according to an exemplary embodiment of the present invention.

Next, the first access point 21 transmits the extended probe response frame of FIG. 8 to the mobile station 1 in response to the probe request frame received in operation 71, and the mobile station 1 receives the extended probe response frame (73). Then, channel scanning between the first access point 21 and the mobile station 1 is terminated.

Next, the second access point 22 counts the number of frames that it transmitted or received for a period of time F in order to measure the amount of data that the second access point 21 transmitted and received in the period of time F (74). The period of time F must be less than the difference between the amount of time required to receive the probe request frame and the amount of time required to transmit a response frame to the probe request frame.

Next, the second access point 22 transmits the extended probe response frame of FIG. 8 to the mobile station 1 in response to the probe request frame received in operation 71, and the mobile station 1 receives the extended probe response frame (73). Then, channel scanning between the second access point 22 and the mobile station 1 is terminated.

FIG. 8 is a view illustrating the construction of an extended probe response frame according to an exemplary embodiment of the present invention. Referring to FIG. 8, the probe response frame is a management frame according to the IEEE 802.11 standard. A frame body field of the probe response frame includes a timestamp field 81, a beacon interval field 82, a capability information field 83, an SSID field 84, a supported rates field 85, an FH parameter set field 86, a DS parameter set field 87, a CF parameter set field 88, and an IBSS parameter set field 89.

In the present exemplary embodiment, the frame body field of the extended probe response frame further includes fields recording information regarding access points that are estimated to be present in the communication area of the mobile station 1, that is, a number of associated stations field 810 recording the number of mobile stations associated with the access point, and a number of frames field 811 recording the number of frames transmitted from or received by the access point for a period of time F.

Referring to FIG. 7, the mobile station 1 measures the strengths of signals received from the first and second access points 21 and 22 in which channel scanning performed in operations 71 through 75 is completed, and performs operation 77 when the measuring result shows that the strengths of the signals received from the first and second access points 21 and 22 are greater than that of a signal received from an access point associated with the mobile station 1 (76).

Next, the mobile station 1 computes a network load value of an access point that is estimated to be present in the communication area of the mobile station 1, based on information obtained from the result of channel scanning performed in operation 71 through 75, i.e., information contained in the extended probe response frames received in operations 73 and 75 (77). More specifically, in operation 76, the mobile station 1 computes the network load values in the first and second access points 21 and 22 by multiplying values recorded in the number of associated stations field 810 and the number of frames field 811 of the extended probe response frame, as shown in the following Equation (1). That is, the network load values are computed by multiplying the number of mobile stations associated with access points (the first and second access points 21 and 22) that are estimated to be present in the communication area of the mobile station 1 by the number of frames transmitted from or received by the first and second access points 21 and 22 for a period of time F.

$$\text{network load} = (\text{number of associated stations}) \times (\text{number of frames}) \quad (1)$$

Next, the mobile station 1 performs a handover to one of the first and second access points 21 and 22, based on the network load values obtained in operation 77 (78). In detail, in operation 78, the mobile station 1 performs a handover to the first or second access point 21 or 22 that has a smaller value of the network load values obtained in operation 77. FIG. 7 illustrates that the mobile station 1 performs a handover to the first access point 21, which means that the network load value of the first access point 21 is less than that of the second access point 22.

Figure 9:
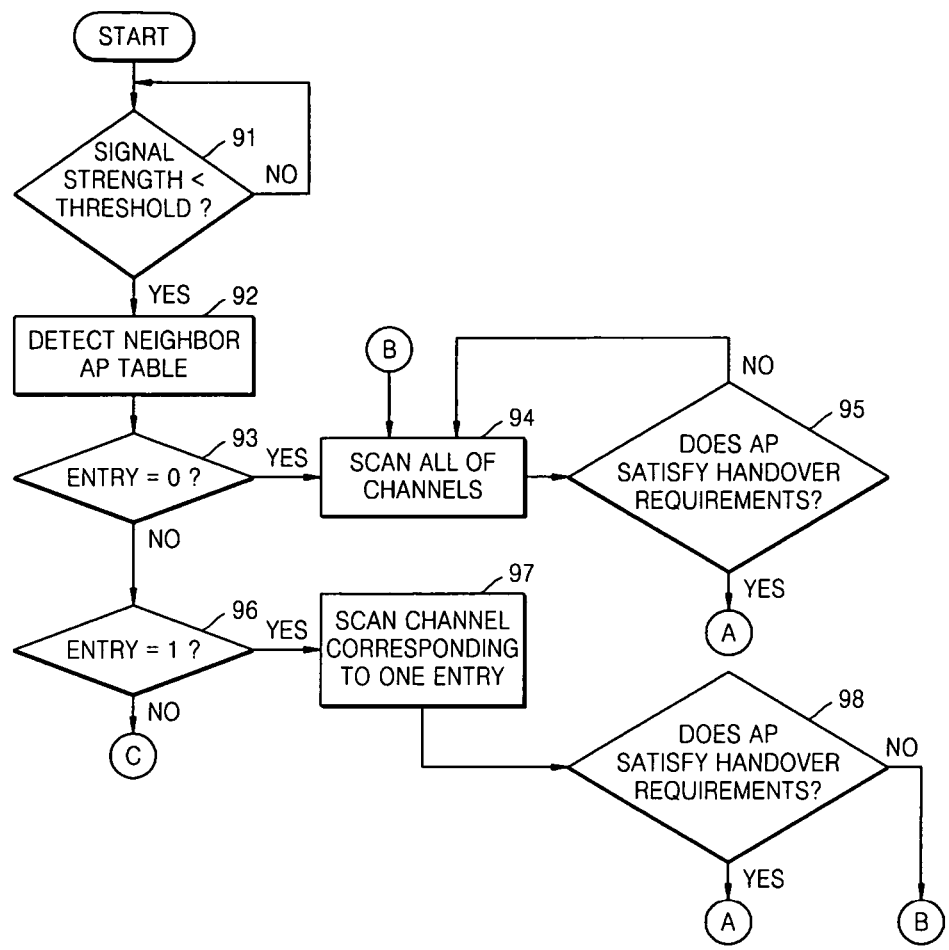
FIGS. 9 and 10 are flowcharts illustrating a handover method performed by a mobile station according to an exemplary embodiment of the present invention.
Figure 10:
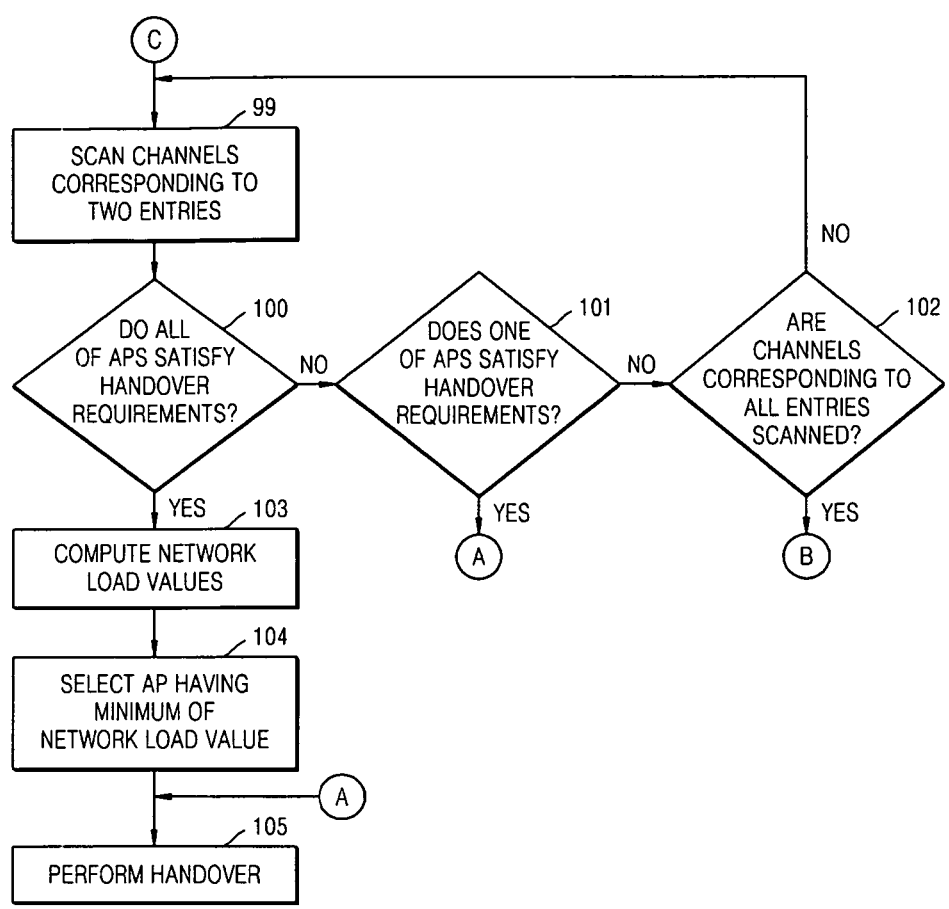

FIGS. 9 and 10 are flowcharts illustrating a handover method performed by a mobile station according to an exemplary embodiment of the present invention. The handover method of FIGS. 9 and 10 includes parts of the handover methods illustrated in FIGS. 4 and 7, which are performed by the mobile station. Therefore, although not described in detail, the handover methods of FIGS. 4 and 7 are also applied to the handover method of FIGS. 9 and 10.

Referring to FIGS. 9 and 10, the mobile station measures the strength of a signal received from an access point associated with the mobile station and compares the signal strength to a predetermined threshold (91). If the signal strength is not less than the predetermined threshold, the mobile station continuously measures the strength of a signal received from the access point.

If the signal strength is less than the predetermined threshold, the mobile station detects its neighbor access point table to determine the number of entries of the neighbor access point table (92).

Next, the mobile station determines whether the number of entries is 0 (93). If it is determined that the number of entries is 0 in operation 93, the mobile station scans all of a plurality of channels available to the mobile station (94). That is, in operation 94, the mobile station transmits a probe request frame via all of the available channels.

Next, when the mobile station receives an extended probe response frame from at least one of a plurality of access points that receive the probe request frame transmitted in operation 94, the mobile station determines whether the access point satisfies handover requirements (95). That is, in operation 95, the mobile station measures the strength of a signal received from the access point and determines whether the measured signal strength is greater than the strength of a signal received from the access point associated with the mobile station. If the access point does not satisfy the handover requirements (i.e., if the measured signal strength is not greater than the strength of the signal received from the access point associated with the mobile station), the mobile station repeats operation 94. If the access point satisfies the handover requirements, the mobile station selects the access point to which a handover will be performed and performs the handover (105).

If it is determined that the number of entries is not 0 in operation 93, the mobile station determines whether the number of entries is 1 (96). If the mobile station determines in operation 96 that the neighbor access point table has one entry, the mobile station scans a channel corresponding to the entry of the neighbor access point table (97). In other words, in operation 97, the mobile station transmits a probe request frame to an access point that manages a BSS having a BSS ID recorded in a BSS ID field of the entry, via a channel having a channel number recorded in a channel field of the entry of the neighbor access point table.

Next, when the mobile station receives an extended probe response frame from an access point that receives the probe request frame transmitted in operation 97, the mobile station determines whether the access point satisfies the handover requirements (98). That is, in operation 98, the mobile station measures the strength of a signal received from the access point, and determines whether the measured signal strength is greater than the strength of a signal received from the access point associated with the access point. If the access point does not satisfy the handover requirements (i.e., if the measured signal strength is not greater than the strength of the signal received from the access point associated with the mobile station), the mobile station performs operation 94. If the access point satisfies the handover requirements, the mobile station selects the access point to which a handover will be performed and performs the handover (105).

If the mobile station determines in operation 96 that the neighbor access point table has more than one entry, the mobile station scans channels corresponding to two entries of the neighbor access point table (99). That is, in operation 99, the mobile station transmits probe request frames to access points that manage BSSs having BSS IDs recorded in BSS ID fields of the two entries, via channels having channels numbers recorded in channels fields of the two entries of the neighbor access point table.

Next, when the mobile station receives extended probe response frames from the access points receiving the probe request frame transmitted in operation 99, the mobile station determines whether all of the access points satisfy the handover requirements (100). That is, in operation 100, the mobile station measures the strengths of signals received from the access points and determines whether the measured signal strengths are greater than the strength of a signal received from the access point associated with the mobile station.

If it is determined that all of the access points do not satisfy the handover requirements in operation 100, the mobile station determines whether one of the access points transmitting the extended probe response frame received in operation 100 satisfies the handover requirements (101). That is, in operation 101, the mobile station measures the strengths of signals received from the access points and determines whether one of the measured signal strengths is greater than the strength of a signal received from the access point associated with the mobile station. If one of the access points satisfies the handover requirements, the mobile station selects one of the access points that satisfies the handover requirements, as an access point to which a handover will be performed, and performs the handover (105).

If none of the access points satisfies the handover requirements, the mobile station determines whether all of the entries of the neighbor access point table have been scanned (102). If it is determined that all of the entries have not been scanned, the mobile station scans channels corresponding to two entries of the remaining entries of the neighbor access point table, except the already scanned entries (99). If it is determined that all of the entries have been scanned, the mobile station performs operation 94

If it is determined that all of the access points satisfy the handover requirements in operation 100, the mobile station computes network load values of access points that are estimated to be present in the communication area of the mobile station, i.e., access points corresponding to the entries of the neighbor access point table, by multiplying values recorded in the number of associated stations field 810 and the number of frames field 811 of the extended probe response frame received in operation 100 (103).

Next, the mobile station selects one of the access points that has a minimum network load value of the network load values computed in operation 103, as an access point to which a handover will be performed (104).

Next, the mobile station performs a handover to the access points selected in operations 95, 98, 101, and 104 (105). More specifically, in operation 105, the mobile station performs a handover by transmitting an extended reassociation request frame to the access points selected in operations 95, 98, 101, and 104 and receiving reassociation response frames from the access points receiving the extended reassociation request frame. The other handover particulars are disclosed in the IEEE 802.11 standard.

In particular, in operation 105, the mobile station transmits the extended reassociation request frame to which the number of associated stations field 56 recording the number of mobile stations associated with the access points, and the channel number field 57 recording the channel numbers of the channels that the access points use are added, in order to notify information regarding the access points that are estimated to be present in the communication area of the mobile station, i.e., information regarding access points adjacent to the access point associated with the mobile station.

Figure 11:
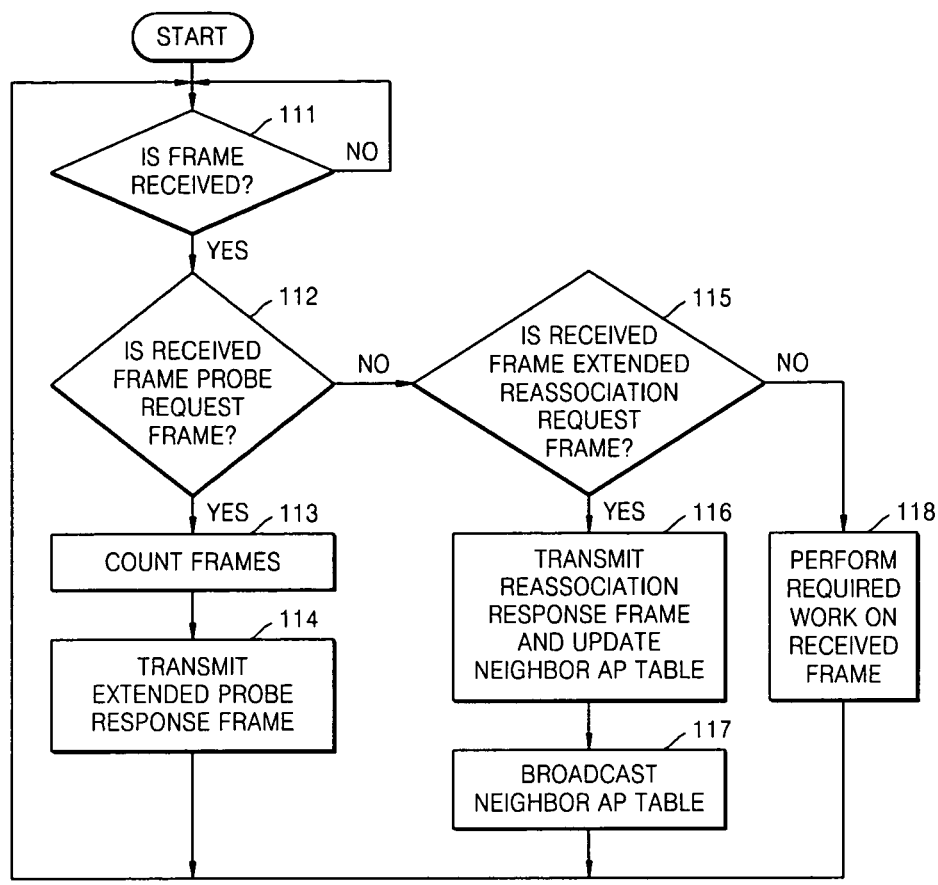
FIG. 11 is a flowchart illustrating a handover supporting method performed by an access point, according to an exemplary embodiment of the present invention.

FIG. 11 is a flowchart illustrating a handover supporting method performed by an access point, according to an exemplary embodiment of the present invention. The method of FIG. 11 includes parts of the handover methods of FIGS. 4 and 7, which are performed by an access point. Therefore, although not described here, the handover methods of FIGS. 4 and 7 are also applied to the method of FIG. 11.

Referring to FIG. 11, an access point receives a frame from a mobile station present in a BSS that the access point manages (111).

Next, the access point determines whether the frame received in operation 111 is a probe request frame (112). If it is determined that the received frame is a probe request frame, the access point counts frames that it transmitted or received for a period of time F (113).

Next, the access point transmits to the mobile station an extended probe response frame including the number of associated stations field 810 that records the number of mobile stations associated with the access point and the number of frames field 811 that records the number of frames that the access point transmitted or received for the period of time F (114).

If it is determined that the received frame is not a probe request frame in operation 112, the access point determines whether the received frame is an extended reassociation request frame (115). If it is determined that the received frame is an extended reassociation request frame, the access point updates information regarding access points that are estimated to be present in a communication area of the mobile station by transmitting a reassociation response frame, and adding values recorded in a number of reassociated stations field and a channel number field of the extended reassociation request frame, to a neighbor access point table (116). That is, in operation 116, the access point updates the neighbor access point table with information regarding mobile station present in a subnet being managed by an access point associated with the mobile station, based on information collected by the associated access point.

Next, the access point broadcasts a frame having a neighbor access point table to all of a plurality of mobile stations present in a BSS managed by the access point (117).

If it is determined that the received frame is not an extended reassociation request frame in operation 115, the access point performs a required task on the frame received in operation 111 when the received frame is neither an extended reassociation request frame nor a probe request frame (118). For instance, in operation 118, when the received frame is a frame related to authentication, the access point performs authentication on the received frame.

Figure 12:
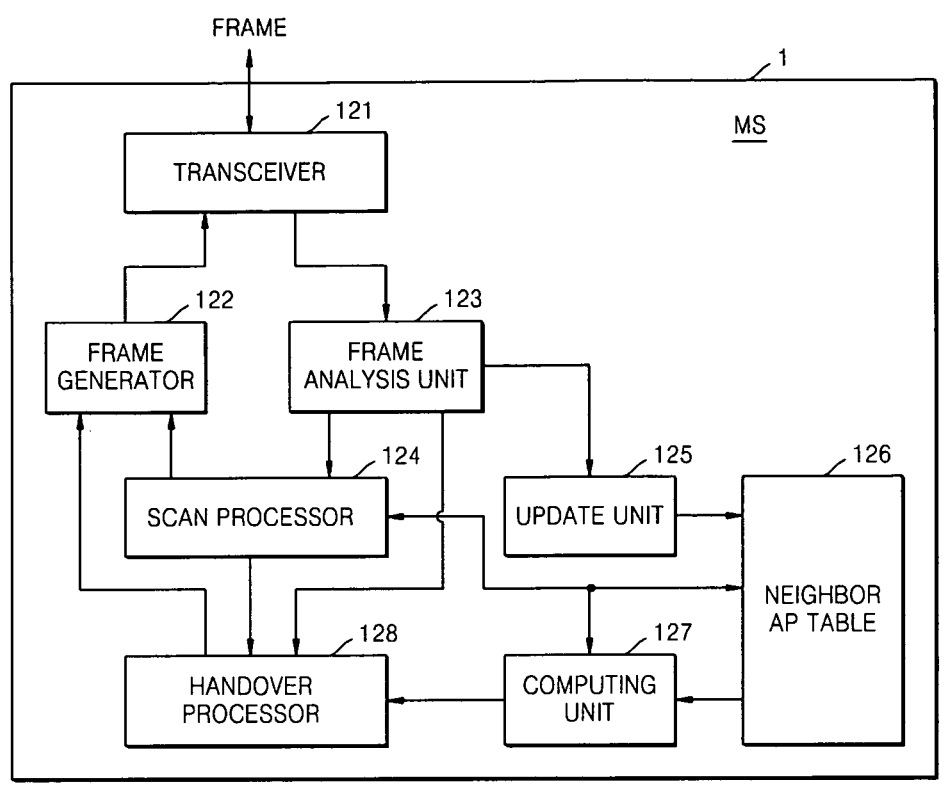
FIG. 12 is a block diagram illustrating the construction of a handover apparatus used by a mobile station, according to an exemplary embodiment of the present invention.

FIG. 12 is a block diagram illustrating the construction of a handover apparatus of a mobile station, according to an exemplary embodiment of the present invention. Referring to FIG. 12, the handover apparatus includes a transceiver 121, a frame generator 122, a frame analysis unit 123, a scan processor 124, an update unit 125, a neighbor access point table 126, a computing unit 127, and a handover processor 128. In the present exemplary embodiment, the handover apparatus performs the handover methods of FIGS. 4, 7, and 9 and 10, performed by a mobile station. Accordingly, although not described, the handover methods of FIGS. 4, 7, and 9 and 10 are also applied to the handover apparatus of FIG. 12.

The transceiver 121 transmits a frame generated by the frame generator 122 to or receives a frame from an access point associated with the mobile station via a channel that the mobile station uses.

The frame generator 122 generates a probe request frame according to an instruction given from the scan processor 124 or an extended reassociation request frame according to an instruction given from the handover processor 128, and transmits the generated frame to the transceiver 121.

The frame analysis unit 123 analyzes the frame received by the transceiver 121, outputs the frame to the scan processor 124 when the frame received by the transceiver 121 is an extended probe response frame, outputs the frame to the handover processor 128 when the frame is a reassociation response frame, or outputs the frame to the update unit 125 when the frame includes a neighbor access point table.

The scan processor 124 measures the strength of a signal received from an access point associated with the mobile station, and detects a neighbor access point table of the mobile station to learn the number of entries of the neighbor access point table when the measured signal strength is less than a predetermined threshold. If the number of entries of the neighbor access point table is determined to be 0, the scan processor 124 instructs the frame generator 122 to generate probe request frames corresponding to channels available to the mobile station. When it is determined that neighbor access point table has one entry, the scan processor 124 instructs the frame generator 122 to generate a probe request frame corresponding to a channel corresponding to the entry of the neighbor access point table. When it is determined that neighbor access point table has two or more entries, the scan processor 124 instructs the frame generator 122 to generate probe request frames corresponding to channels corresponding to two entries of the entries of the neighbor access point table.

Also, the scan processor 124 determines whether an access point transmitting the extended probe response frame received from the frame analysis unit 123 satisfies the handover requirements, and instructs the handover processor 128 to perform a handover to the access point when the access point satisfies the handover requirements. Also, the scan processor 124 outputs information regarding access points that are estimated to be present in a communication area of the mobile station to the computing unit 126, the output information being included in information included in the extended probe response frame.

The update unit 125 updates the neighbor access point table 126 based on a neighbor access point table included in the frame received from the frame analysis unit 123. That is, the update unit 125 updates the neighbor access point table 126 with information regarding the mobile station present in a subnet that is managed by the access point associated with the mobile station, based on information collected by the associated access point.

The computing unit 127 computes network load values based on information received from the scan processor 124. Specifically, the computing unit 127 computes the network load values in the access points that are estimated to be present in the communication area of the mobile station, i.e., access points corresponding to entries of the neighbor access point table, by multiplying values recorded in a number of associated stations field and a number of frames field of the extended probe response frame.

The handover processor 128 performs a handover to a selected access point to which a handover will be performed according to an instruction given from the scan processor 124. More specifically, the handover processor 128 instructs the frame generator 122 to generate an extended reassociation request frame to be transmitted to the selected access point. The other handover particulars are disclosed in the IEEE 802.11 standard.

Figure 13:
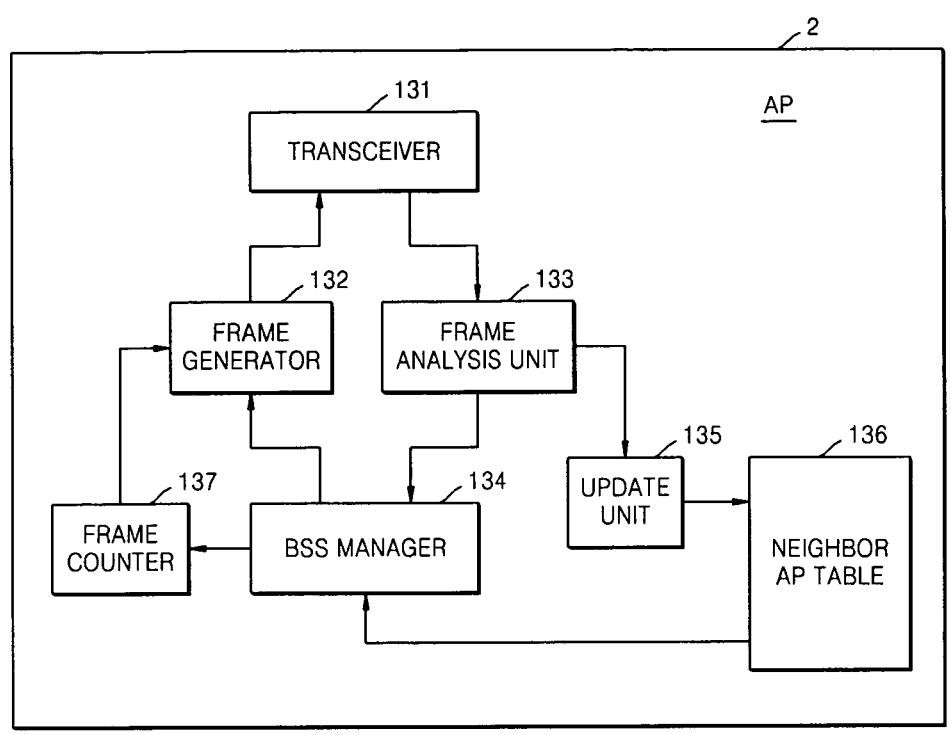
FIG. 13 is a block diagram illustrating the construction of a handover supporting apparatus used by an access point, according to an exemplary embodiment of the present invention.

FIG. 13 is a block diagram illustrating the construction of a handover supporting apparatus of an access point, according to an exemplary embodiment of the present invention. Referring to FIG. 13, the handover supporting apparatus includes a transceiver 131, a frame generator 132, a frame analysis unit 133, a BSS manager 134, an update unit 135, a neighbor access point table 136, and a frame counter 137. In the present exemplary embodiment, the handover supporting apparatus performs the handover supporting method of FIGS. 4, 7, and 11 performed by an access point. Therefore, although not described, the handover supporting method of FIGS. 4, 7, and 11 is also applied to the handover supporting apparatus of FIG. 13.

The transceiver 131 transmits a frame generated by the frame generator 132 to or receives a frame from a mobile station present in a BSS that is managed by an access point, via a channel used by the access point.

The frame generator 132 generates an extended probe response frame or a reassociation response frame according to an instruction given from the BSS manager 134. In particular, the frame generator 132 generates an extended probe response frame including a number of associated stations field that records the number of mobile stations associated with the access point and the number of frames field that records values measured by the frame counter 137.

The frame analysis unit 133 analyzes the frame received from the transceiver 131 and outputs the frame to the BSS manager 134 when the frame is a probe request frame or an extended reassociation request frame. In particular, if the frame is the extended reassociation request frame, the frame analysis unit 133 also outputs the frame to the update unit 115.

The BSS manager 134 instructs the frame generator 132 to generate the extended probe response frame and the frame counter 137 to count frames, based on information included in the probe request frame received from the frame analysis unit 133. Also, the BSS manager 134 instructs the frame generator 132 to generate the reassociation response frame, based on information included in the extended reassociation request frame received from the frame analysis unit 133.

The update unit 135 updates the neighbor access point table 136 based on information included in the extended reassociation request frame received from the frame analysis unit 133. Specifically, the update unit 135 updates information regarding access points that are estimated to be present in a communication area of the mobile station by adding values recorded in a number of associated stations field and a channel number field of the extended reassociation request frame to the neighbor access point table 136.

The frame counter 137 counts frames that are transmitted or received for a period of time F according to an instruction given from the BSS manager 134, and outputs the counting result to the frame generator 132.

The above exemplary embodiments of the present invention may be embodied as a computer program. The computer program may be stored in a computer readable medium and executed using a general digital computer. The data constructions used in the exemplary embodiments may be stored in a computer readable medium using various devices.

Examples of the computer-readable medium include a magnetic recording medium (ROM, a floppy disc, a hard disc, etc.), an optical recording medium (CD-ROM, a DVD, etc.), or even carrier waves (such as in transmission over the Internet).

According to the present invention, channels available to a mobile station are selectively scanned based on information regarding access points that are estimated to be present in a communication area of the mobile station, thereby minimizing a handover latency and immediately performing a handover at a link layer of a wireless LAN.

Also, according to the present invention, network load values in access points are computed based on the information regarding the access points that are estimated in the communication area of the mobile station, and a handover is performed to one of the access points based on the network load values, thereby evenly dispersing the network load to a plurality of access points.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A handover method which is performed in a mobile station, the handover method comprising:

receiving, from an access point associated with the mobile station, a first frame including information regarding a plurality of access points which are estimated to be present in a communication area of the mobile station;

updating information which the mobile station has, based on the information included in the first frame;

selectively scanning a plurality of channels used by the access points, among a plurality of channels which are available to the mobile station, by transmitting a second frame via channels, the type of the second frame being different from the type of the first frame, based on the updated information; and performing a handover to one of the access points based on a result of the scanning, wherein the information received from the access point includes information related to network loads of the plurality of access points.

2. The handover method of claim 1, wherein the information included in the received first frame comprises a channel number of channels used by the access points.

3. The handover method of claim 1, wherein the access point to which the handover is performed is a neighbor access point which is adjacent to the access point associated with the mobile station.

4. The handover method of claim 3, wherein the neighbor access point is associated with another mobile station present in a subnet managed by the access point associated with the mobile station.

5. The handover method of claim 1, further comprising computing network load values of the access points, based on the updated information, wherein during the performing the handover, the handover is performed to the one of the access points, which has a minimum network load value of the computed network load values.

6. A handover apparatus of a mobile station, the handover apparatus comprising:

a receiver which receives, from an access point associated with the mobile station, a first frame including information regarding a plurality of access points which are estimated to be present in a communication area of the mobile station;

a update unit which updates information which the mobile station has, based on the information included in the received first frame;

a scan processor which selectively scans a plurality of channels used by the access points, among a plurality of channels which are available to the mobile station, by transmitting a second frame via channels, the type of the second frame being different from the type of the first frame, based on the updated information; and a handover processor which performs a handover to one of the access points based on a result of the scanning, wherein the information received from the access point includes information related to network loads of the plurality of access points.

7. A non-transitory computer readable medium having recorded thereon a computer program for a handover method which is performed in a mobile station, the handover method comprising:

receiving, from an access point associated with the mobile station, a first frame including information regarding a plurality of access points which are estimated to be present in a communication area of the mobile station;

updating information which the mobile station has, based on the information included in the received first frame;

selectively scanning a plurality of channels used by the access points, among a plurality of channels which are available to the mobile station, by transmitting a second frame via channels, the type of the second frame being different from the type of the first frame, based on the updated information; and performing a handover to one of the access points based on a result of the scanning, wherein the information received from the access point includes information related to network loads of the plurality of access points.

8. A handover method which is performed in a mobile station, the handover method comprising:

selectively scanning a plurality of channels, which are available to the mobile station and used by a plurality of access points which are estimated to be present in a communication area of the mobile station, wherein the selectively scanning comprises receiving, from the plurality of access points, information related to a number of packets which each of the access points transmits or receives for a predetermined period of time and a number of mobile stations associated with each of the access points;

computing a network load value of each of the plurality of access points, based on the number of packets and the number of mobile stations if it is determined that all of the plurality of access points satisfy a handover requirement; and performing a handover to one of the access points based on the computed network load values.

9. The handover method of claim 8, wherein during the computing network load values, the network load values are computed by multiplying the number of the packets by the number of the mobile stations.

10. The handover method of claim 8, wherein during the performing the handover, the handover is performed to one of the estimated access points, which has a minimum network load value of the computed network load values.

11. The handover method of claim 8, wherein the receiving the information comprises receiving a probe response frame from each of the access points, the probe response frame comprising fields recording the information, wherein during the computing network load values, the network load values are computed based on information contained in the received probe response frame.

12. A handover apparatus in a mobile station, the handover apparatus comprising:

a scan processor which selectively scans a plurality of channels, which are available to the mobile station and used by a plurality of access points which are estimated to be present in a communication area of the mobile station, wherein the selectively scanning comprises receiving, from the plurality of access points, information related to a number of packets which each of the access points transmits or receives for a predetermined period of time and a number of mobile stations associated with each of the access points;

a computing unit which computes a network load value of each of the plurality of access points, based on the number of packets and the number of mobile stations if it is determined that all of the plurality of access points satisfy a handover requirement; and a handover processor which performs a handover to one of the access points based on the computed network load values.

13. A non-transitory computer readable medium having recorded thereon a computer program for a handover method which is performed in a mobile station, the handover method comprising:

selectively scanning a plurality of channels, which are available to the mobile station and used by a plurality of access points which are estimated to be present in a communication area of the mobile station, wherein the selectively scanning comprises receiving, from the plurality of access points, information related to a number of packets which each of the access points transmits or receives for a predetermined period of time and a number of mobile stations associated with each of the access points;

computing a network load value of each of the plurality of access points, based on the number of packets and the number of mobile stations if it is determined that all of the plurality of access points satisfy a handover requirement; and performing a handover to one of the access points based on the computed network load values.

14. A handover supporting method which is performed in an access point for a mobile station, the handover supporting method comprising:

updating, by the access point, information regarding at least one access point which is estimated to be present in a communication area of the mobile station, based on information received from at least one mobile station other than the mobile station, wherein the received information relates to a network load of each of the at least one access point; and a channel number of a channel used by the estimated access point; and a total number of mobile stations associated with the estimated access point;

transmitting, by the access point, the updated information to the mobile station to selectively scan channels available to the mobile station.

15. The handover supporting method of claim 14, further comprising receiving a reassociation request frame from the mobile station, the reassociation request frame comprising fields recording the information, the updating information comprises updating the information based on the information contained in the reassociation request frame.

16. A handover supporting apparatus of an access point for a mobile station, the handover supporting apparatus comprising:

an update unit of the access point, updating information regarding one or more access points which are estimated to be present in a communication area of the mobile station, based on information received from at least one mobile station other than the mobile station, wherein the received information relates to a network load of each of the estimated access points; and a channel number of a channel used by the estimated access point; and a total number of mobile stations associated with the estimated access point;

a transmitter of the access point, transmitting the information updated by the update unit to the mobile station to selectively scan channels available to the mobile station.

17. A non-transitory computer readable medium having recorded thereon a computer program for a handover supporting method which is performed in an access point for a mobile station, the handover supporting method comprising:

updating, by the access point, information regarding at least one access point which is estimated to be present in a communication area of the mobile station, based on information received from at least one mobile station other than the mobile station, wherein the received information relates to a network load of each of the at least one access point; and a channel number of a channel used by the estimated access point; and a total number of mobile stations associated with the estimated access point;

transmitting, by the access point, the updated information to the mobile station to selectively scan channels available to the mobile station.

18. The handover method of claim 1, wherein the received information has been updated using information provided by another mobile station present in a subnet managed by the access point associated with the mobile station.

* * * * *